United States Patent [19]
Breid et al.

[11] Patent Number: 5,860,092
[45] Date of Patent: Jan. 12, 1999

[54] APPARATUS AND METHOD FOR ADDRESSING A CACHE MEMORY IN A COMPUTER SYSTEM UTILIZING CACHE TAG MEMORY WITH INTEGRATED ADDER AND PRE-DECODE CIRCUIT

[75] Inventors: Duane G. Breid, Lakeville; Roger Roisen, Minnetrista; Ronald D. Isliefson, Lakeville, all of Minn.

[73] Assignee: LSI Logic Corporation, Milpitas, Calif.

[21] Appl. No.: 804,329

[22] Filed: Feb. 14, 1997

[51] Int. Cl.[6] ...................................... G06F 12/00
[52] U.S. Cl. .................. 711/118; 711/4; 711/200; 395/381; 395/383; 365/49; 365/189.01; 365/189.02; 365/189.05; 365/230.03
[58] Field of Search ..................... 395/381, 383; 711/4, 118, 200, 210; 365/189.01, 49, 189.02, 189.05, 230.03

[56] References Cited

U.S. PATENT DOCUMENTS 5,337,415  8/1994  Delano et al. ........................ 395/375
5,475,825  12/1995  Yonezawa et al. ....................... 711/1
5,577,223  11/1996  Tanoi et al. ........................... 711/118
5,687,339  11/1997  Hwang ................................. 395/383
5,689,672  11/1997  Witt et al. ........................... 395/389

*Primary Examiner*—Tod R. Swann
*Assistant Examiner*—Tuan V. Thai
*Attorney, Agent, or Firm*—Westman, Champlin & Kelly

[57] ABSTRACT

A tag memory circuit includes an address index input, an address offset input and an integrated adder and pre-decode circuit. The integrated adder and pre-decode circuit has a first addend input coupled to the address index input, a second addend input coupled to the address offset input, and a pre-decoded sum output. A final row decode and word line driver circuit is coupled to the pre-decoded sum output and generates a word line output which is coupled to the address inputs of a tag memory array. The data outputs of the tag memory array are coupled to a sense amplifier.

13 Claims, 8 Drawing Sheets

APPARATUS AND METHOD FOR ADDRESSING A CACHE MEMORY IN A COMPUTER SYSTEM UTILIZING CACHE TAG MEMORY WITH INTEGRATED ADDER AND PRE-DECODE CIRCUIT

BACKGROUND OF THE INVENTION

The present invention relates to an apparatus and method for addressing a cache in a computer system and, more particularly, to a cache tag memory having an integrated adder and pre-decode circuit.

A cache is a small, fast memory which stores the data that has been most recently accessed by a central processing unit (CPU). When the CPU requires a particular word or block of data, the CPU first looks in the cache. If the data is not present in the cache, the CPU retrieves the data from a remote device, such as main memory, and stores the data in the cache. If the data is present in the cache, the CPU retrieves the data from the cache, as opposed to main memory. A cache therefore limits the number of times the CPU must go to main memory to access data, which significantly increases the rate of data retrieval.

A typical cache is divided into a data memory and a tag memory. The data memory stores the data that was retrieved from main memory. The tag memory stores a portion of the address of the data that was stored in the data memory. When the CPU searches the cache, the CPU retrieves an address index corresponding to the desired data from an index register and adds an address offset to obtain a cache target address. The cache target address has a block size field, a tag size field and a tag compare field. The block size field determines the number of corresponding data blocks in the data memory that are valid if a cache hit occurs for the cache target address. The tag size field is decoded and used to drive the tag memory address bits. The tag compare field is compared with the address that is stored in the tag memory. If there is a match, the data in the data memory, and the number subsequent blocks of data determined by the block size field are valid data and can be accessed by the CPU.

When the tag size field is decoded, individual bits within the tag size field are typically paired and pre-decoded into separate nets whose active states (normally high) represent successive integer values such as 0, 1, 2, 3, etc. These nets are then further decoded by a row decode circuit and provided to word line drivers which drive the memory address lines and allow for reading from or writing to the tag memory cells. The total propagation time required to access the selected tag memory cells is the time that is required to add the address offset to the address index, plus the time that is required to pre-decode the resulting sum, plus the time that is required to perform the final row decode. This propagation time is a significant limitation in the overall speed of the cache.

SUMMARY OF THE INVENTION

The tag memory circuit of the present invention includes an address index input, an address offset input and an integrated adder and pre-decode circuit. The integrated adder and pre-decode circuit has a first addend input coupled to the address index input, a second addend input coupled to the address offset input, and a pre-decoded sum output. A final row decode and word line driver circuit is coupled to the pre-decoded sum output and generates a word line output which is coupled to the address inputs of a tag memory array. The data outputs of the tag memory array are coupled to a sense amplifier.

In one embodiment, the integrated adder and decode circuit generates true and complement signals from selected bits of the address index input. The true and complement signals are logically ANDed in predetermined combinations to obtain a set of pre-sum outputs, wherein only one of the pre-sum outputs has an active state based on the logic states of the selected bits of the address index input. The position of the pre-sum output that has the active state is rotated within the set based on the logic states of corresponding bits of the address offset input.

Bits of the address index input and the address offset input having lesser significance than the selected bits are added together to generate a carry input. The order of the pre-sum outputs are then adjusted within the set as a function of the carry input to generate the plurality of pre-decoded address signals, which have been corrected for the carry input.

DETAILED DESCRIPTION OF THE PREFERRED EMBODIMENTS

Figure 1:
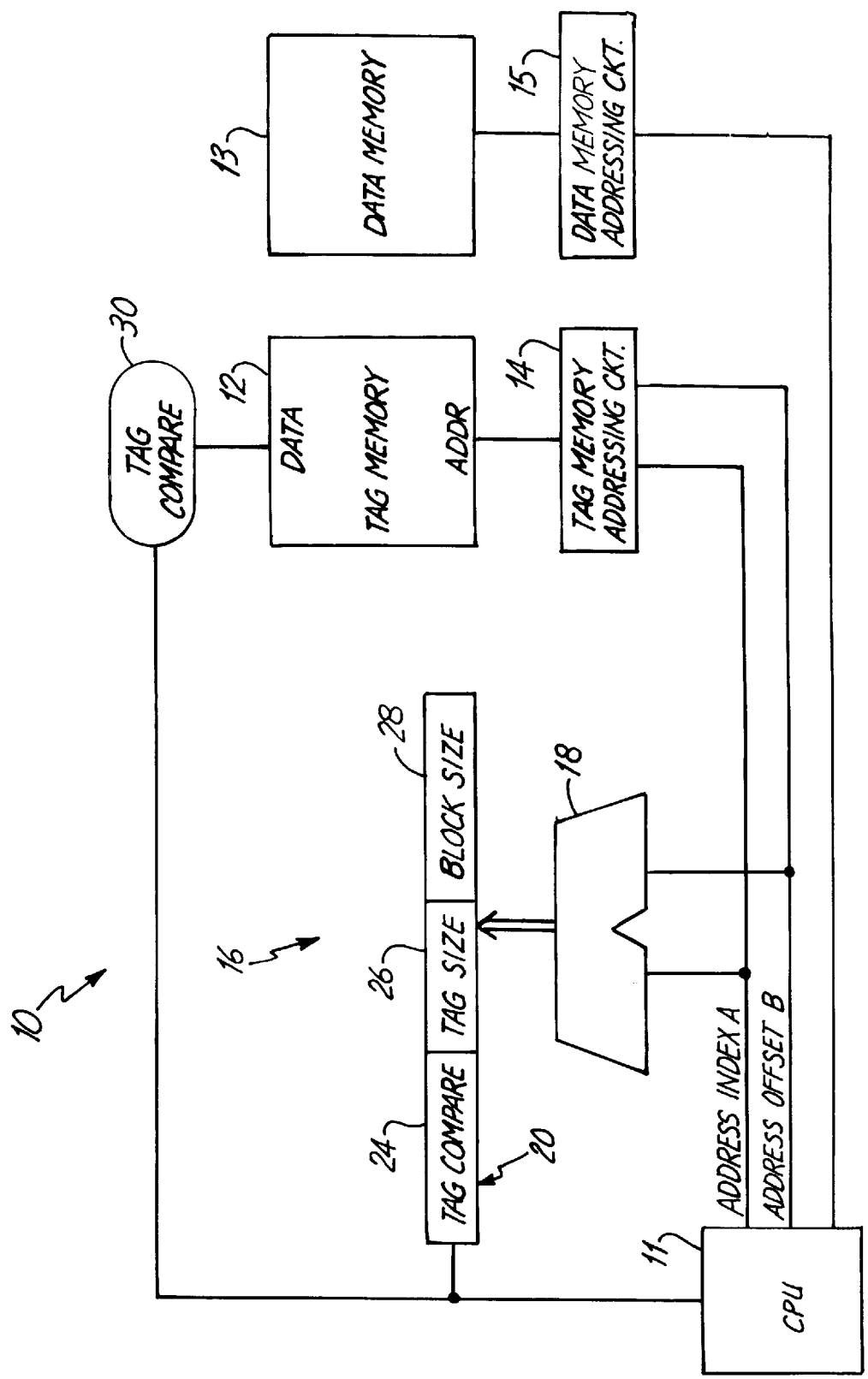
FIG. 1 is a schematic representation of a cache system according to the present invention.

FIG. 1 is a schematic representation of a cache system 10 according to the present invention. Cache system 10 includes central processing unit (CPU) 11, tag memory 12, data memory 13, tag memory addressing circuit 14, data memory addressing circuit 15 and tag validation circuit 16. Tag memory 12 stores a portion of the address of each valid data line that is stored in data memory 13. Data memory 13 stores the data lines that have been most recently accessed by CPU 11 from a remote storage device such as a main memory, which is not shown. Tag memory 12 and data memory 13 can include random access memories (RAMs), for example, and can be implemented in separate memory arrays or as separate fields in the same memory array. Tag memory addressing circuit 14 addresses the contents of tag memory 12 under the control of CPU 11. Similarly, data memory addressing circuit 15 addresses the contents of data memory 13 under the control of CPU 11. Data memory addressing circuit 15 can include any conventional data addressing circuit.

Tag validation circuit 16 includes adder 18 and cache target address register 20. CPU 11 provides a 32-bit address index A and a 32-bit address offset B to adder 18. Address index A and address offset B are typically stored in registers within CPU 11 or its surrounding circuitry. Adder 18 adds address offset B to address index A and stores the result in cache target address register 20. The cache target address in register 20 includes a tag compare field 24, a tag size field 26 and a block size field 28. Tag compare field 24 is formed of the most significant bits of the cache target address and is compared by CPU 11 with the contents of tag memory 12 to determine whether there is corresponding valid data within data memory 13. Tag size field 26 defines the address of the contents of tag memory 12. Block size field 28 specifies the number of valid blocks of data within data memory 13 that correspond to the cache target address. In one embodiment, the cache target address is a 32-bit word CTADDR[0:31], where CTADDR[0:4] is the block size field, CTADDR[5:9] is the tag size field and CTADDR[10:31] is the tag compare field.

In a typical cache, only the bits within tag size field 26 and the carry out of block size field 28 are used to address the tag memory. As a result, only these bits from adder 18 are time critical. The more significant bits in tag compare field 24 are not time critical since they are used only in a comparison after the tag memory has been accessed. Furthermore, the less significant bits in block size field 28 are required to provide only a carry output in a time critical manner for the addition of the tag size bits.

According to the present invention, the time critical address bits of tag size field 26 within register 20 are not used to address tag memory 12 as in a typical tag memory. Rather, the bits within address index A and address offset B that generate tag size field 26 and block size field 28 are provided directly to tag memory addressing circuit 14, which combines the carry generation of the block size bits, the addition of the tag size bits and a pre-decoding of the resulting sum into unified function. The resulting output is then further decoded by conventional row decode and address driver circuitry for driving the row decode inputs of tag memory 12. The addressed contents of tag memory 12 are provided as a tag output 30, which is read by CPU 11 and compared with tag compare field 24 of register 20. If there is a match, the corresponding data in data memory 13 is valid and retrieved by CPU 11.

Figure 2:
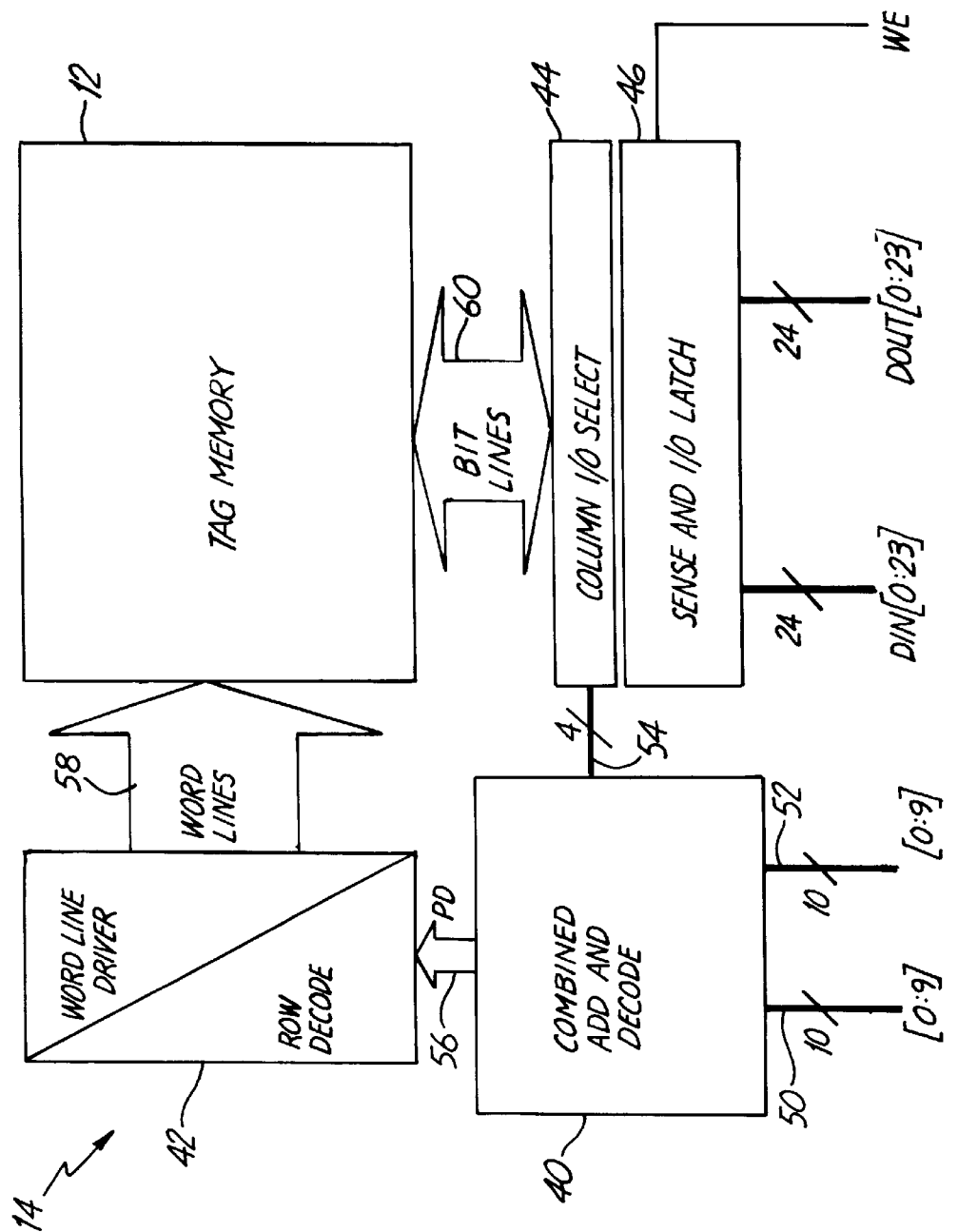
FIG. 2 is a block diagram of a tag memory addressing circuit according to the present invention.

Tag memory addressing circuit 14 is shown in greater detail in FIG. 2. Tag memory addressing circuit 14 includes combined add and pre-decode block 40, row decode and word line driver block 42, column I/O select block 44 and sense amplifier and I/O latch block 46. In this embodiment, tag memory 12 is a 16×48 bit memory array, which has 16 rows and 48 bits which are configured as two column bits per data output for a total of 24 data output bits. Each row can therefore store two 24-bit tag compare fields, with one field in each column. The tag size and block size bits A[0:9] and B[0:9] of address index A and address offset B are provided to inputs 50 and 52 of combined add and pre-decode block 40. Bit 5 of the tag size field is used to select the column of tag memory 12, while bits 6–9 of the tag size field are used to select the row. Block 40 adds A[5] to B[5] with a carry in from the sum of A[0:4] and B[0:4]. The resulting sum is pre-decoded and provided to column I/O select block 44 over output 54 for selecting the column of tag memory 12. Block 40 also adds A[6:9] to B[6:9] with a carry in from the sum of A[0:5] and B[0:5]. As an integrated function and during the addition, block 40 pre-decodes bits A[6:9] and B[6:9]. The integrated function is described in more detail below. The pre-decoded result is provided to row decode and word line driver block 42 as a multi-bit pre-decoded row address PD.

Row decode and word line driver block 42 is a conventional memory address driver which receives the pre-decoded row address PD, performs a final row decode and then drives word lines 58 of tag memory 12 in a known manner. Word lines 58 select a particular row of tag memory 12 as a function of the decoded row address bits. During a read operation, the selected row of tag memory 12 is provided to column I/O select block 44 over bit lines 60.

Column I/O select block 44 selects one of the words in the selected row as a function of output 54 and provides the selected word to sense amplifier and I/O latch block 46. The retrieved word can then be read by CPU 11 (shown in FIG. 1) over data output DOUT[0:23] and compared with tag compare field 24 of cache target address register 20 (shown in FIG. 1). Sense amplifier and I/O latch block 46 also includes a data input DIN[0:23] and a write enable input WE. When write enable input WE is active, the data applied to data input DIN[0:23] is written into block 46 and then stored in tag memory 12 as a function of the decoded row and column addresses.

Figure 3:
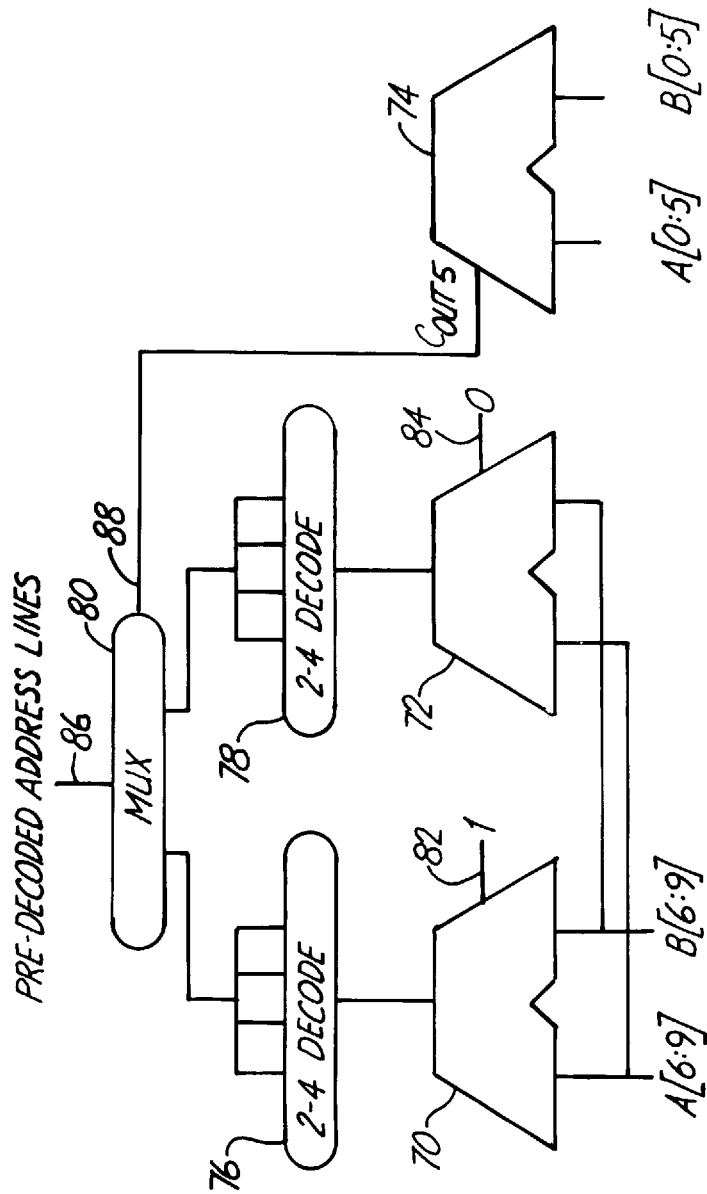
FIG. 3 is a figurative representation of a unified add and decode function performed in the tag memory addressing circuit shown in FIG. 2.

FIG. 3 is a diagrammatic representation of the unified add and pre-decode function performed by combined add and pre-decode block 40. Block 40 includes adders 70, 72 and 74, 2×4 address pre-decode circuits 76 and 78 and final carry 2×1 multiplexer 80. The tag size bits A[6:9] and B[6:9] of address index A and address offset B are applied to adders 70 and 72. A carry in of "1" is applied to adder 70 at input 82, and a carry in of "0" is applied to adder 72 at input 84. The outputs of adders 70 and 72 are applied to respective 2×4 pre-decode circuits 76 and 78, which decode the resulting sums into pre-decoded 4-bit address lines. The two sets of pre-decoded address lines are applied to the inputs of 2×1 multiplexer 80, which applies one of the two sets to output 86 as a function of a carry out signal $C_{OUT5}$ applied to select input 88.

Carry out signal $C_{OUT5}$ is the carry generated by adder 74 from the addition of address index bits A[0:5] and address offset bits B[0:5]. If $C_{OUT5}$ is one, then 2×1 multiplexer 80 selects the output of 2×4 pre-decode circuit 76 to drive output 86. If $C_{OUT5}$ is zero, then 2×1 multiplexer 74 selects the output of 2×4 decode circuit 78 to drive output 86. This allows address index bits A[6:9] and address offset bits B[6:9] to be added together without having to wait for the carry from the less significant bits. 2×1 multiplexer 80 selects the correct sum as a function of the actual carry, $C_{OUT5}$, from adder 74.

Figure 4:
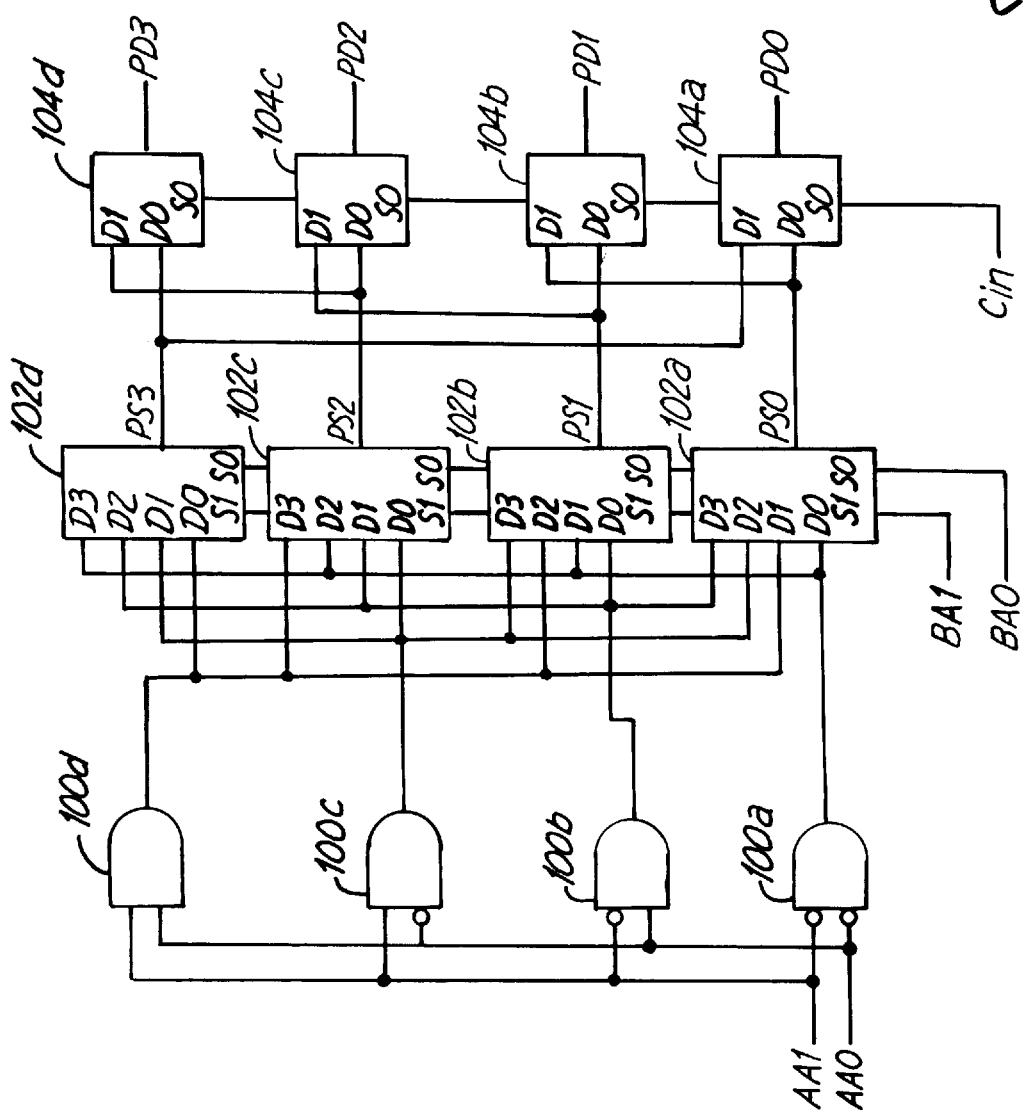
FIG. 4 is a logical representation of a two-bit combined add and decode circuit according to the present invention.

As shown in FIG. 3, the decoding of the tag size bits is integrated within the addition of address index A and address offset B by performing the decode function prior to the final carry determination. In addition, 2×4 pre-decode circuits 76 and 78 and adders 70 and 72 are not separate circuits, but are integrated with one another such that the combination performs a single, unified function as shown in FIG. 4. FIG. 4 is a logical representation of a two-bit combined add and pre-decode circuit 98 according to one embodiment of the present invention. Circuit 98 includes two-input AND gates 100a, 100b, 100c and 100d, 4×1 multiplexers 102a, 102b, 102c and 102d, and 2×1 multiplexers 104a, 104b, 104c and 104d. The tag size bits of address index A and address offset B that are used for generating a row address are paired and then added together. Inputs AA0 and AA1 represent a respective pair of address index bits, such as bits A[6] and A[7]. Inputs BA0 and BA1 represent a corresponding pair of address offset bits, such as bits B[6] and B[7]. Carry input Cin represents the carry output, such as $C_{OUT5}$, from the addition the lesser significant tag size bits and block size bits. AND gates 100a–100d receive respective combinations of inputs AA0, AA1 and their complements. One of the outputs of AND gates 100a–100d will be driven to a logic high level as a function of the logic states of inputs AA0 and AA1. The outputs of AND gates 100a–100d are applied in respective orders to the data inputs of 4×1 multiplexers 102a–102d such that the logic high level is applied to a different data input of each 4×1 multiplexer 102a–102d.

Inputs BA0 and BA1 are applied to the select inputs of 4×1 multiplexers 102a–102d and select which of the data inputs will be applied to respective pre-sum output PS0–PS3 of each multiplexer. One of the pre-sum outputs PS0–PS3 will be a logic high depending on the states BA0 and BA1. None of the other pre-sum outputs PS0–PS3 will be a logic high. The output that is high is the effective add of AA0,AA1 and BA0,BA1. Multiplexers 102a–102d essentially rotate the position of the logic high level among pre-sum outputs PS0–PS3 as a function of the logic states of BA0 and BA1. The final carry selection is made with 2×1 multiplexers 104a–104d. The carry input Cin is applied to the select inputs of multiplexers 104a–104d. Pre-sum outputs PS0–PS3 are applied to the data inputs of multiplexers 104a–104d in selected combinations such that pre-decode outputs PD0–PD3 of multiplexers 104a–104d reflect the correct carry from the addition of the lesser significant bits of address index A and address offset B. Pre-decode outputs PD0–PD3 are then applied to row decode and write line driver block 42 (shown in FIG. 2).

Figure 5:
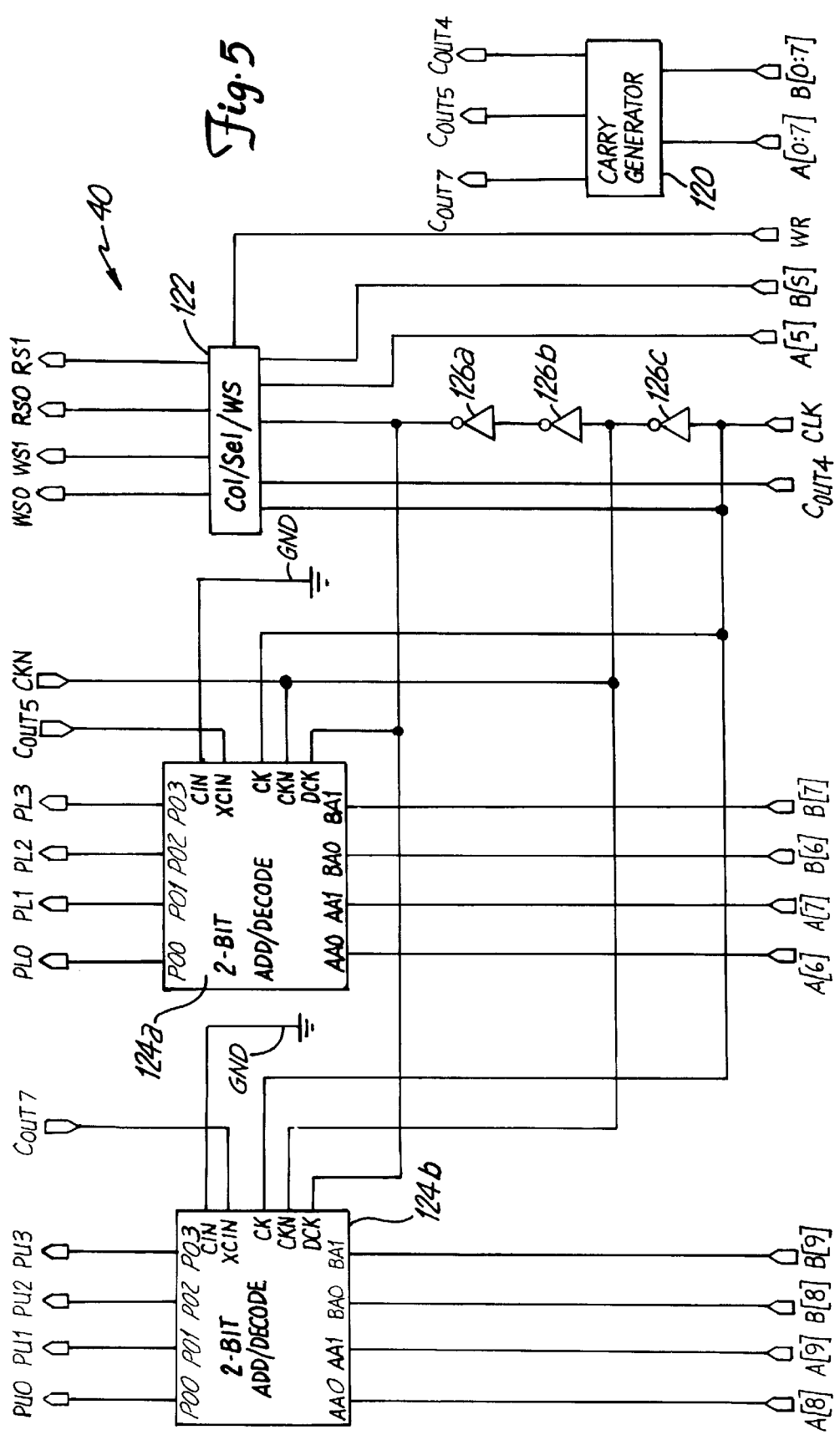
FIG. 5 is a schematic diagram of a tag address add and decode circuit according to a particular embodiment of the present invention.

FIGS. 5–8 illustrate a tag memory addressing circuit according to a particular embodiment of the present invention. FIG. 5 is a block diagram of combined add and pre-decode block 40. Block 40 includes carry generator 120, column select/write select block 122, two-bit add and decode blocks 124a and 124b and inverters 126a–126c. Carry generator 120 receives address index bits A[0:7] and address offset bits B[0:7] and performs a partial add to generate the carry out of bits 4, 5, and 7, labeled $C_{OUT4}$, $C_{OUT5}$ and $C_{OUT7}$.

Column select/write select block 122 receives carry out $C_{OUT4}$, clock signal CLK, address index bit A[5], address offset bit B[5] and write enable signal WR. Inverters 126a–126c are coupled together in series between clock signal input CLK and block 122. Column select/write select block 122 performs a pseudo-add of $C_{OUT4}$, A[5] and B[5] and, depending on the result, enables column 0 or column 1 of tag memory 12 (shown in FIG. 2). Column select/write select block 122 generates four outputs, WS0, WS1, RS0 and RS1. WS0 and WS1 are write select signals for columns 0 and 1, respectively, of tag memory 12. RS0 and RS1 are read select signals for columns 0 and 1, respectively, of tag memory 12. The logic state of write enable WR determines whether the write select or the read select output for the corresponding column is enabled. Outputs WS0, WS1, RS0 and RS1 are provided to column I/O select block 44 in FIG. 2 for enabling the appropriate bit lines 60.

Two-bit add and decode block 124a performs a two-bit combined add and pre-decode of address index bits A[6:7] and address offset bits B[6:7] and provides the result as a pre-decoded lower row address on outputs PL0–PL3. Similarly, two-bit add and decode block 124a performs a two-bit combined add and pre-decode of address index bits A[8:9] and address offset bits B[8:9] and provides the result as a pre-decoded upper row address on outputs PU0–PU3. Block 124a includes: inputs AA0, AA1, BA0 and BA1 which are coupled to address index bits A[6:7] and address offset bits B[6:7], respectively; carry input CIN which is coupled to ground terminal GND; carry input XCIN which is coupled to carry output $C_{OUT5}$; clock inputs CK, CKN and DCK which receive various phases of clock signal CLK; and outputs P00–P03 which are coupled to outputs PL0–PL3. Block 124b includes: inputs AA0, AA1, BA0 and BA1 which are coupled to address index bits A[8:9] and address offset bits B[8:9], respectively; carry input CIN which is coupled to ground terminal GND; carry input XCIN which is coupled to carry output $C_{OUT7}$; clock inputs CK, CKN and DCK which receive various phases of clock signal CLK; and outputs P00–P03 which are coupled to outputs PU0–PU3. Pre-decoded upper and lower row address outputs PU0–PU3 and PL0–PU3 are provided to row decode and word line driver block 42 (shown in FIG. 2) for final decoding and addressing of tag memory 12.

Figure 6:
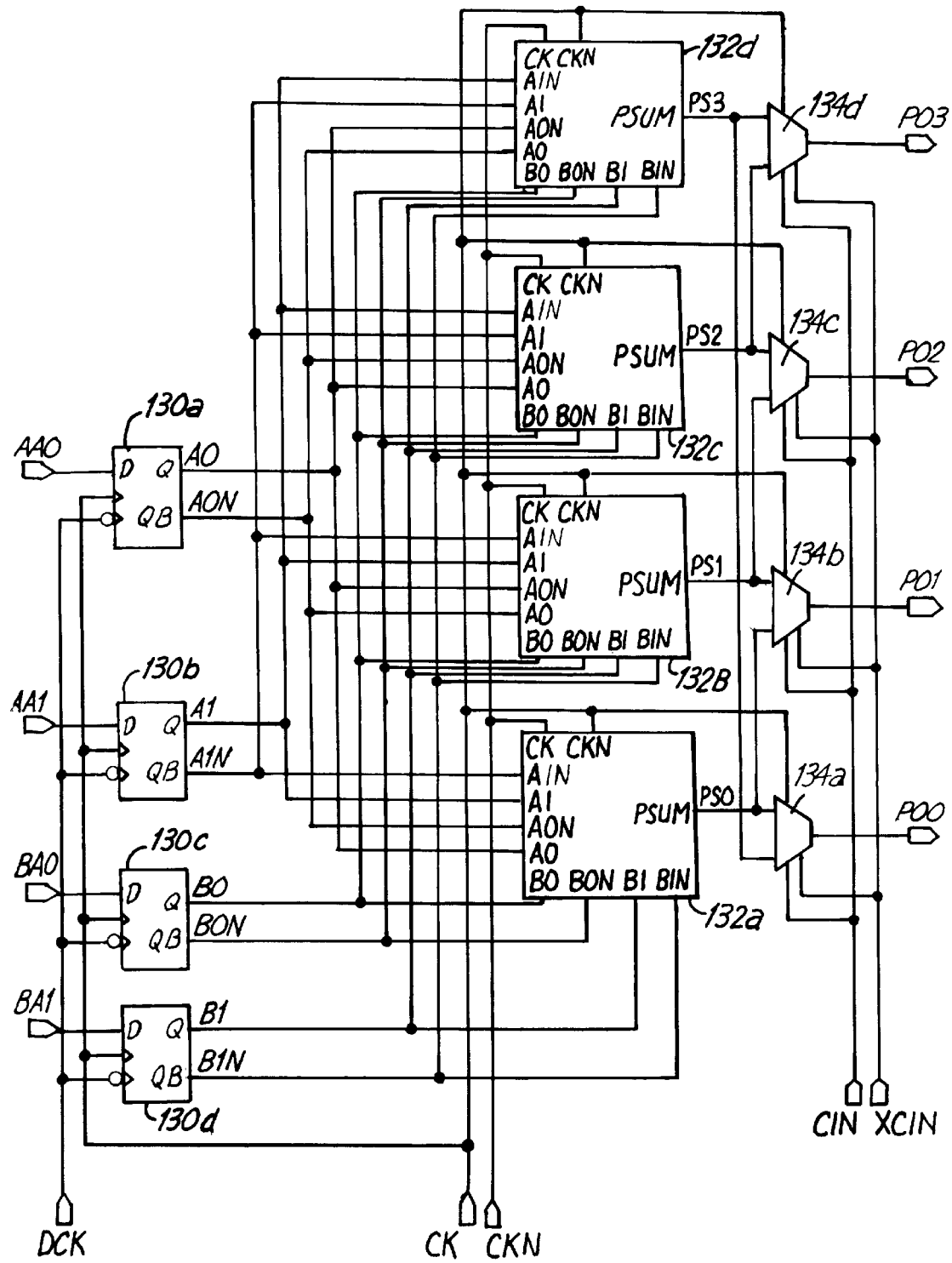
FIG. 6 is a schematic diagram of a two-bit add and decode block within the circuit shown in FIG. 5.

FIG. 6 is a block diagram which shows one of the two-bit add and decode blocks 124a and 124b in greater detail. Each block 124a and 124b includes latches 130a, 130b, 130c and 130d, pre-sum and decode segments 132a, 132b, 132c and 132d and final carry select multiplexers 134a, 134b, 134c and 134d. Inputs AA0, AA1, BA0 and BA1 are coupled to the data inputs of latches 130a, 130b, 130c and 130d, respectively, which are latched by clock signals CK and DCK. Latch 130a has complementary outputs A0 and A0N, latch 130b has complementary outputs A1 and A1N, latch 130c has complementary outputs B0 and B0N, and latch 130d has complementary outputs B1 and B1N. Pre-sum and decode segments 132a–132d each include inputs A0, A0N, A1, A1N, B0, B0N, B1 and B1N. Outputs B0, B0N, B1 and B1N, of latches 130c and 130d are coupled to inputs B0, B0N, B1 and B1N, respectively, of segments 132a–132d. Output A0 of latch 130a is coupled to input A0 of segments 132a and 132c and to inputs A0N of segments 132b and 132d. Output A0N of latch 130a is coupled to inputs A0N of segments 132a and 132c and to inputs A0 of segments 132b and 132d. Output A1 of latch 130b is coupled to input A1 of segments 132a and 132c and to input A1N of segments 132c and 132d. Output A1N of latch 130b is coupled to input A1N of segments 132a and 132b and to input A1 of segments 132c and 132d.

Segments 132a–132d include clock inputs CK and CKN which are coupled to respective clock signals CK and CKN. Segments 132a–132d also include pre-sum outputs PS0–PS3, respectively. Pre-sum outputs PS0–PS3 correspond to pre-sum outputs PS0–PS3 of FIG. 4. Pre-sum outputs PS0–PS3 are coupled in selected combinations to the data inputs of multiplexers 134a–134d, as in FIG. 4. Carry input XCIN is coupled to the select input of each multiplexer 134a–134d for selecting which of the data inputs are coupled to outputs P00–P03, respectively. This selects the correct sum of AA0, AA1 and BA0, BA1 as a function of the carry from the sum of the less significant bits of the address index and the address offset.

Figure 7:
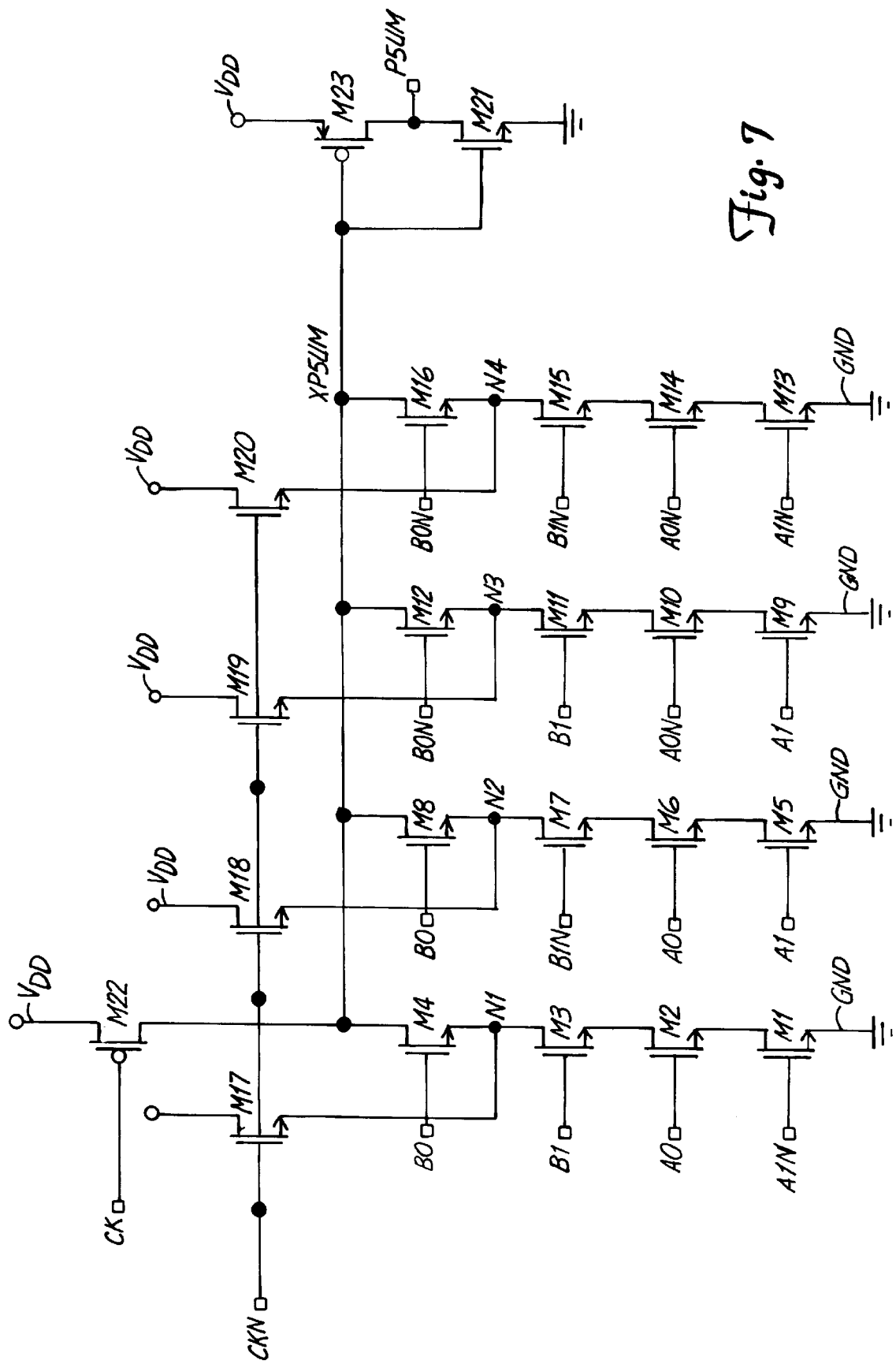
FIGS. 7 and 8 are a schematic diagrams of dynamic logic implementations of "even" and "odd" pre-sum/decode segments within FIG. 6.
Figure 8:
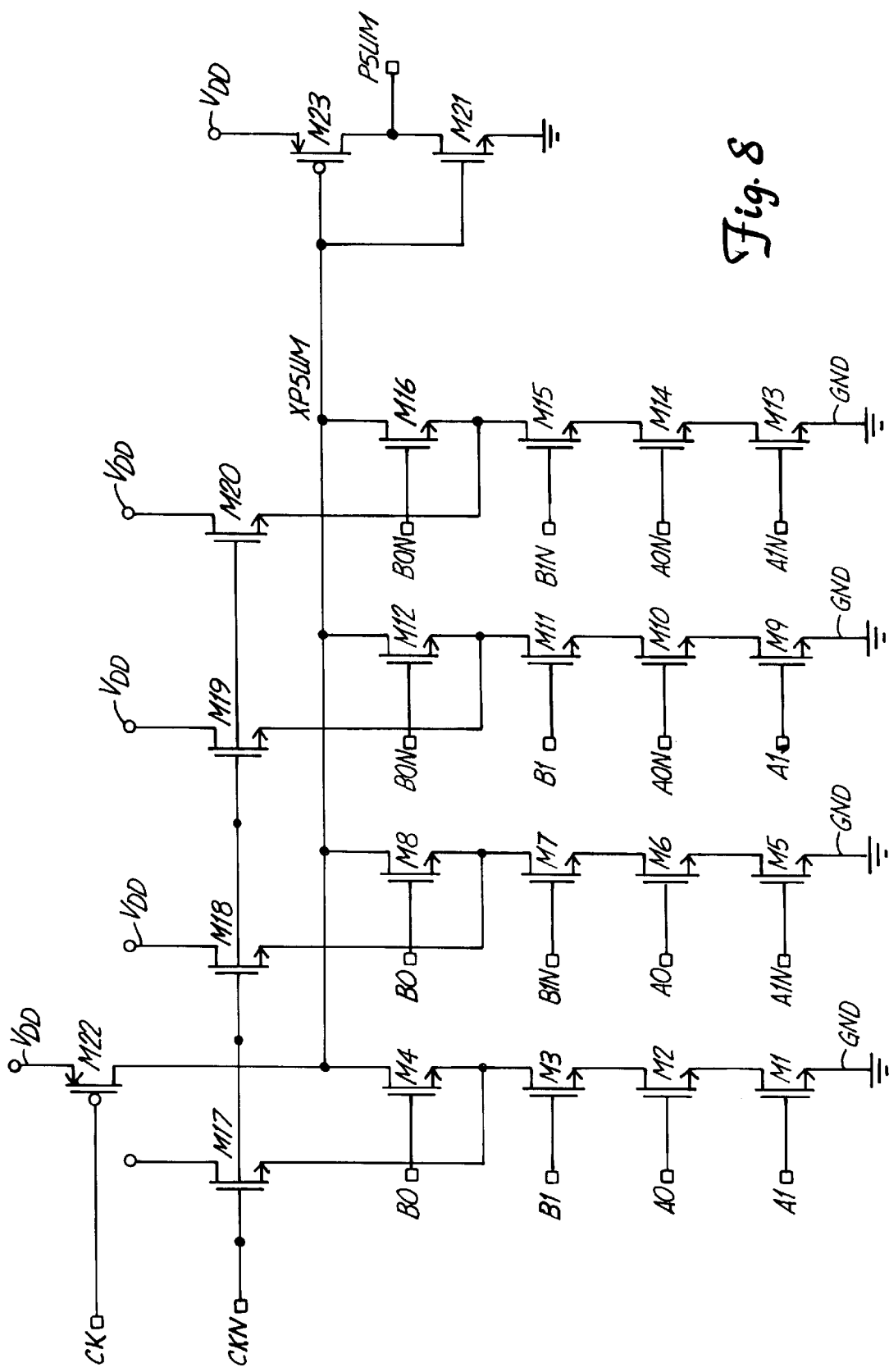

FIG. 7 is a schematic diagram of a dynamic logic implementation of one of the "even" pre-sum and decode segments 132a and 132c. The "odd" segments 132b and 132d are shown in FIG. 8. Each segment 132a and 132b includes N-channel transistors M1–M21 and P-channel transistors M22 and M23. Transistors M1–M16 are arranged in four legs, M1–M4, M5–M8, M6–M12 and M13–M16, with the drains and sources of the transistors in each leg coupled in cascode between node XPSUM and ground terminal GND. In the first leg, the gates of transistors M1–M4 are coupled to inputs A1N, A0, B1 and B0, respectively. In the second leg, the gates of transistors M5–M8 are coupled to inputs A1, A0, B1N and B0, respectively. In the third leg, the gates of transistors M9–M12 are coupled to inputs A1, A0N, B1 and B0N, respectively. In the fourth leg, the gates of transistors M13–M16 are coupled to inputs A1N, A0N, B1N and B0N.

Transistors M1–M16 perform the combined functions of AND gates 100a–100d and one of the 4×1 multiplexers 102a–102d of FIG. 4. Transistor pairs (M1 and M2), (M5 and M6), (M9 and M10) and (M13 and M14) function as two-input inverting AND gates with outputs at the drains of transistors M2, M6, M10 and M14. These inverting AND gates pull the drains of the respective transistors M2, M6, M10 and M14 toward the voltage at ground terminal GND only when both gates of the respective transistor pair are pulled high. Based on the logic states of A0, A0N, A1 and A1N, only one of the drains of transistors M2, M6, M10 and M14 will be low at a time.

Transistor pairs (M3 and M4), (M7 and M8), (M11 and M12) and (M15 and M16) perform the multiplexer select function. Based on the logic states of B0, B0N, B1 and B1N, only one of the outputs at the drains of transistors M2, M6, M10 and M14 will be coupled to node XPSUM. Node XPSUM is coupled to output PSUM through an inverter formed by transistors M21 and M23, which are coupled between supply terminal VDD and ground terminal GND. Output PSUM corresponds to one of the pre-sum outputs PS0 and PS2 of FIG. 4.

Transistors M17–M20 and M22 are precharge transistors which precharge nodes N1–N4 and XPSUM, respectively, to the voltage at supply terminal VDD when the clock signals applied to clock inputs CK and CKN are inactive.

FIG. 8 is a schematic diagram of a dynamic logic implementation of one of the "odd" pre-sum and decode segments 132b and 132d. The schematic diagram shown in FIG. 8 is identical to that shown in FIG. 7, but the inputs to the gates of transistors M1 and M5 are interchanged. Input A1 is coupled to the gate of transistor M1, and input A1N is coupled to the gate of transistor M5. The combination of segments 132a–132d, as implemented in FIGS. 7 and 8, provide four pre-sum outputs which reflect the addition and a 2×4 pre-decode of two address index bits and two address offset bits. The addition and pre-decode functions of the row address generation circuit are integrated into a single, unified function. The propagation delay for each function is no longer additive as in a conventional row address generation circuit. Since the functions are combined, they have smaller overall propagation delay, which significantly speeds a tag compare operation. The combined add and decode circuits can be implemented in a variety of ways in alternative embodiments. These embodiments can include dynamic or static logic and can be modified to add or decode any number of bits. Also, the particular logical functions performed by the present invention can be implemented in a variety of ways.

Conclusion

Since only a select number of bits in the cache target address are used to address a typical tag memory, only these output bits from the addition of the address index and the address offset are time critical. The cache target address bits that are more significant in value than this group of bits are not time critical. Furthermore, the bits that are less significant in value are only required to provide a carry output in a time critical manner. The present invention combines the carry generation of the less significant bits, the addition of the bits required for the row address, and the pre-decoding of the row address into unified function. This allows for selection of a word line from the tag memory in a shorter amount of time than is currently possible with traditional word line accessing techniques. The present invention therefore allows an increase in the cycle rate of high-speed microprocessors which use an internal cache.

Although the present invention has been described with reference to preferred embodiments, workers skilled in the art will recognize that changes may be made in form and detail without departing from the spirit and scope of the invention.

What is claimed is:

1. A tag memory circuit for a cache in a computer system, the tag memory circuit comprising:
   a tag memory array comprising a plurality of address inputs and a plurality of data outputs;
   a sense amplifier circuit coupled to the data outputs;
   an address index input and an address offset input;
   an integrated adder and pre-decode circuit comprising a first addend input coupled to the address index input, a second addend input coupled to the address offset input, and a pre-decoded sum output;
   a row decode circuit coupled to the pre-decoded sum output and having a row decode output; and
   a word line driver circuit coupled between the row decode output and the plurality of address inputs.

2. The tag memory circuit of claim 1 wherein:
   the address index input and the address offset input each comprises a plurality of tag compare bits having a highest significance, a plurality of tag size bits having a medium significance and a plurality of block size bits having a least significance;
   the first addend input is coupled to a first pair of the tag size bits of the address index input; and
   the second addend input is coupled to a second pair of the tag size bits of the address offset input, which have the same significance as the first pair of tag size bits.

3. The tag memory circuit of claim 2 wherein each bit in the first pair of tag size bits comprises a true and a complement tag size bit and wherein the integrated adder and pre-decode circuit further comprises:
   a set of AND gates, wherein each AND gate in the set has inputs coupled to a different combination of the first pair of true tag size bits and the first pair of complement tag size bits, and wherein each AND gate in the set has an output; and
   a first set of multiplexers, wherein each multiplexer in the first set has a plurality of data inputs, a data output and first and second select inputs, wherein the output of each AND gate is coupled to a different data input of each multiplexer in the first set and wherein the first and second select inputs are coupled to the second pair of tag size bits.

4. The tag memory circuit of claim 3 wherein the integrated adder and pre-decode circuit further comprises:
   a carry generation circuit having a first addend input coupled to the tag size bits and the block size bits of the address index input that are of lesser significance than the first pair of tag size bits, a second addend input coupled to the tag size bits and the block size bits of the address offset input that are of lesser significance than the second pair of tag size bits, and a carry output representing a carry out from a sum of the first and second addend inputs to the carry generation circuit;
   a second set of multiplexers, wherein each multiplexer in the second set has a plurality of data inputs, a data output and a select input, wherein the data inputs of each multiplexer in the second set are coupled to a different pair of the data outputs of the multiplexers in the first set, and wherein the select input of each multiplexer in the second set is coupled to the carry output; and
   wherein the data outputs of the second set of multiplexers together define the pre-decoded sum output.

5. The tag memory circuit of claim 1 wherein:
   the address index input comprises a first pair of true tag size bits and a first pair of complement tag size bits and the address offset input comprises a second pair of true tag size bits and a second pair of complement tag size bits; and the integrated adder and pre-decode circuit further comprises four segments, each segment comprising:
a supply terminal;
a pre-sum segment output;
first, second, third and fourth sets of transistors, wherein each set of transistors comprises four transistors coupled together in cascode between the pre-sum segment output and the supply terminal and wherein each transistor has a gate terminal; and
wherein two of the gate terminals in each set are coupled to a respective combination of the true and complement tag size bits of the address index input and the other two gate terminals in each set are coupled to a respective combination of the true and complement tag size bits of the address offset input.

6. The tag memory circuit of claim 5 wherein each segment further comprises an inverter coupled to the pre-sum segment output.

7. The tag memory of claim 5 wherein:
the address index input further comprises bits of lesser significance than the first pair of true tag size bits and the first pair of complement tag size bits, and the address offset input further comprises bits of lesser significance than the second pair of true tag size bits and the second pair of complement tag size bits; and
the integrated adder and pre-decode circuit further comprises:
a carry generation circuit having a first addend input coupled to the address index input bits of lesser significance, a second addend input coupled to the address offset input bits of lesser significance, and a carry output representing a carry out from a sum of the first and second addend inputs to the carry generation circuit;
first, second, third and fourth multiplexers, wherein each multiplexer has first and second data inputs, a data output and a select input, wherein the first and second data inputs of each multiplexer are coupled to a different pair of the pre-sum segment outputs, and wherein the select input of each multiplexer is coupled to the carry output; and
wherein the data outputs of the first, second, third and fourth multiplexers together define the pre-decoded sum output.

8. A method of generating a plurality of word lines for a tag memory in a cache system, the method comprising:
receiving an address index and an address offset;
adding selected bits of the address index and the address offset together to obtain a sum output;
decoding the sum output during the step of adding and as an integrated function with the step of adding to obtain a plurality of pre-decoded address signals; and decoding the pre-decoded address signals to generate the plurality of word lines.

9. The method of claim 8 and further comprising:
adding together bits of the address index and the address offset that are of lesser significance than the selected bits to generate a carry output; and
correcting the pre-decoded address signals as a function of the carry output.

10. The method of claim 8 wherein the steps of adding selected bits and decoding the sum output comprise:
generating true and complement signals from the selected address index bits;
logically ANDing combinations of the true and complement signals together to obtain a set of pre-sum outputs, wherein only one of the pre-sum outputs has an active state based on the logic states of the selected address index bits;
rotating the position of the pre-sum output having the active state within the set as based on the logic states of the selected address offset bits;
adding together bits of the address index and the address offset that are of lesser significance than the selected bits to generate a carry output; and
adjusting the order of the pre-sum outputs within the set as a function of the carry output, after the step of rotating, to generate the plurality of pre-decoded address signals.

11. The method of claim 10 wherein the step of rotating comprises:
applying the set of pre-sum outputs to the data inputs of a plurality of multiplexers in different orders; and
multiplexing data inputs as a function of the selected address offset bits.

12. The method of claim 10 wherein the step of adjusting comprises:
applying the set of pre-sum outputs to the data inputs of a plurality of multiplexers in different orders; and
multiplexing data inputs as a function of the carry output.

13. A tag memory circuit for a cache in a computer system, the tag memory circuit comprising:
a tag memory array having a plurality of address inputs;
means for receiving an address index and an address offset;
means for adding together and decoding selected bits of the address index and the address offset as an integrated function to obtain a pre-decoded sum output; and
means for further decoding the pre-decoded sum output to generate a plurality of word lines and applying the word lines to the plurality of address inputs.

* * * * *